United States Patent [19]

Sullivan et al.

[11] 4,031,252

[45] June 21, 1977

[54] DOCTORING AND DRYING METHOD

[75] Inventors: John F. Sullivan, Drexel Hill; Richard P. Konstance, Philadelphia; Wolfgang K. Heiland, Trevose, all of Pa.

[73] Assignee: The United States of America as represented by the Secretary of Agriculture, Washington, D.C.

[22] Filed: Mar. 10, 1976

[21] Appl. No.: 665,588

[52] U.S. Cl. .............................. 426/445; 15/256.5; 34/33; 34/216; 426/473; 426/518; 426/519

[51] Int. Cl.² ........................ F26B 3/00; A23P 1/00

[58] Field of Search .......... 426/445, 517, 518, 519, 426/465, 473, 295, 505, 504; 34/33, 23, 216, 217, 209; 15/256.5, 256.51; 118/18, 19, 21; 99/539, 567

[56] References Cited

UNITED STATES PATENTS

| | | | |
|---|---|---|---|
| 2,209,636 | 7/1940 | Schubert | 34/217 |
| 2,549,718 | 4/1951 | Spang | 15/256.5 |
| 2,914,788 | 12/1959 | Smith et al. | 15/256.51 |
| 3,009,427 | 11/1961 | Bell | 426/517 X |
| 3,116,124 | 12/1963 | Eolkin | 15/256.51 X |
| 3,169,270 | 2/1965 | Pass | 15/256.5 |
| 3,356,067 | 12/1967 | Krashow et al. | 15/256.5 |
| 3,611,841 | 10/1971 | Froden et al. | 15/256.5 X |
| 3,725,084 | 4/1973 | Rydeski et al. | 426/445 |

FOREIGN PATENTS OR APPLICATIONS

| | | | |
|---|---|---|---|
| 24,320/29 | 12/1929 | Australia | 426/445 |

*Primary Examiner*—S. Leon Bashore
*Assistant Examiner*—Kenneth M. Schor
*Attorney, Agent, or Firm*—M. Howard Silverstein; William E. Scott; David G. McConnell

[57] ABSTRACT

An apparatus and method comprised of a plurality of doctoring units, each of which is a pivotally supported combination doctor blade and V-shaped member, is described. In each unit the leading edge of the doctor blade is parallel to the plane of the surface of a processing belt conveying the material to be dried and the leading edge formed by the two plane faces of the V-shaped member is generally perpendicular to the plane of the belt when the unit is in doctoring position. In addition to doctoring, the apparatus and method imparts a tumbling action to the material being dried by the plowshare action of the V-shaped member. Comestibles dried with this method and apparatus can be transferred directly from the method to a puffing operation, thereby eliminating the usual time consuming equilibration period.

2 Claims, 4 Drawing Figures

DOCTORING AND DRYING METHOD

This invention relates to apparatus and method for doctoring comestibles being dried on a belt in a continuous, through flow air dryer and more particularly to an apparatus and method that, in addition to doctoring, imparts a tumbling motion to individual food pieces thereby providing means for producing a uniformly dried product.

The sticking of products to processing belts is a very serious problem, especially in the food drying industry. It increases production costs and causes many processing plants to lose thousands of dollars per year for each operating dryer. The cost factors resulting from sticking include loss of product, labor assigned to clean and condition the belt for subsequent operations, and reduction of production rate.

In order to solve the problem of food pieces sticking to belts, many processing plants apply some form of wax or oil to their dehydrator belts. However, such treatment is usually effective only for a few cycles because it soon wears away. Release coatings made from a blend of oils and other ingredients are also used, but, like the waxes and oils, they do not provide a permanent solution.

In attempting to develop a continuous puffing system we tried to dry food pieces in a two stage, continuous, through-flow hot air dryer but, because of the adhesiveness of the pieces, our efforts were not successful. The food pieces stuck to each other and to the processing belt so severely that transfer between stages was impossible. In order to cope with the sticking problem we mounted a five finger rake-like device perpendicular to the processing belt. Although this provided a slight improvement, a significant amount of product survived the treatment and remained stuck to other pieces and to the belt.

Consequently, an object of this invention is to provide an inexpensive apparatus and method for doctoring food pieces from a dryer belt.

Another object is to provide an apparatus and method that prevents product pieces from sticking to each other.

A further object is to provide an apparatus and method whereby individual food pieces can be dried more uniformly.

A still further object of this invention is to provide an apparatus and method in which the dried food pieces can be transferred directly from the drying belt to an explosion puffing apparatus thereby eliminating the time consuming and costly equilibration period required by presently available methods.

In general, according to this invention the above objects are accomplished by an apparatus and method comprised of a plurality of novel doctoring units, each of which is a combination doctor blade and V-shaped member wherein the leading edge of the doctor blade is parallel to the plane of a processing belt conveying the material to be dried, and the leading edge formed by the two plane faces of the V-shaped member is generally perpendicular to the plane of the belt when the unit is in doctoring position. The doctor blade is provided with a V-shaped cut out to fit snugly against the V-shaped member and is detachably mounted on a shelf member that is welded or otherwise permanently attached to the lower end of the V-shaped member. The shelf is attached to the V-shaped member so that the angle formed by the plane of its surface and the plane of the surface of the moving belt is a suitable angle for the mounted doctor blade to perform its function. Each unit is supported by an extension arm which is pivotally mounted and is provided with means for varying the doctoring force. The individual units are placed in an arrangement that assures that the complete width of the processing belt is doctored.

The apparatus and method of this invention has been tremendously successful in eliminating the problem of food pieces sticking to each other and to the processing belt. Ordinarily, food pieces dried on a processing belt or by other means required from 2 to 18 hours of equilibration before they could be subjected to a puffing operation. However, we unexpectedly found that no equilibration was necessary with food pieces dried by the apparatus and method of this invention. The food pieces could be transferred directly to the puffing operation from the drying belt.

The invention will now be more fully described with reference to the drawings in which FIG. 1 is a schematic side elevation of the first stage of a continuous hot air dryer having four zones.

Figure 1:
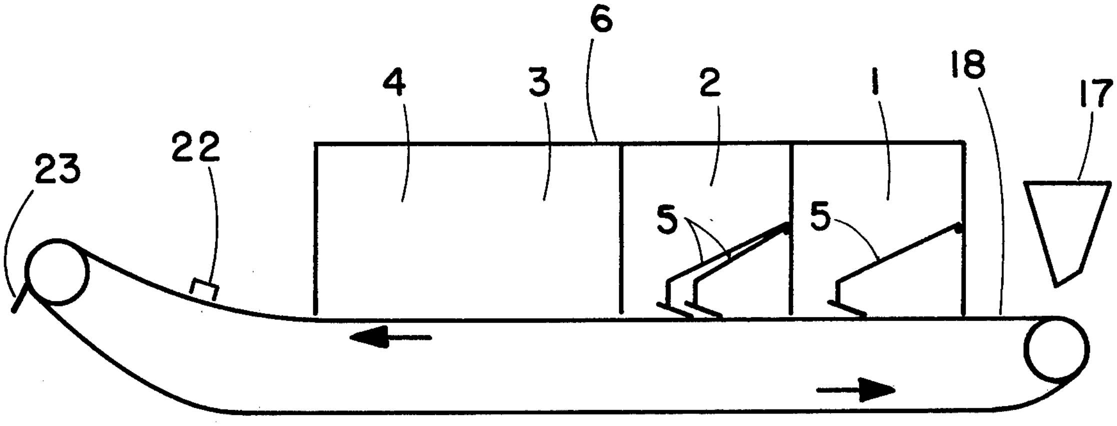

Application of the invention to zones 1 and 2 of the first stage of a two-stage hot air dryer 6 is shown schematically in FIG. 1. Although, for our purposes, no doctoring was done in zones 3 and 4, doctoring units can be operated in these zones if needed or desired.

Figure 2:
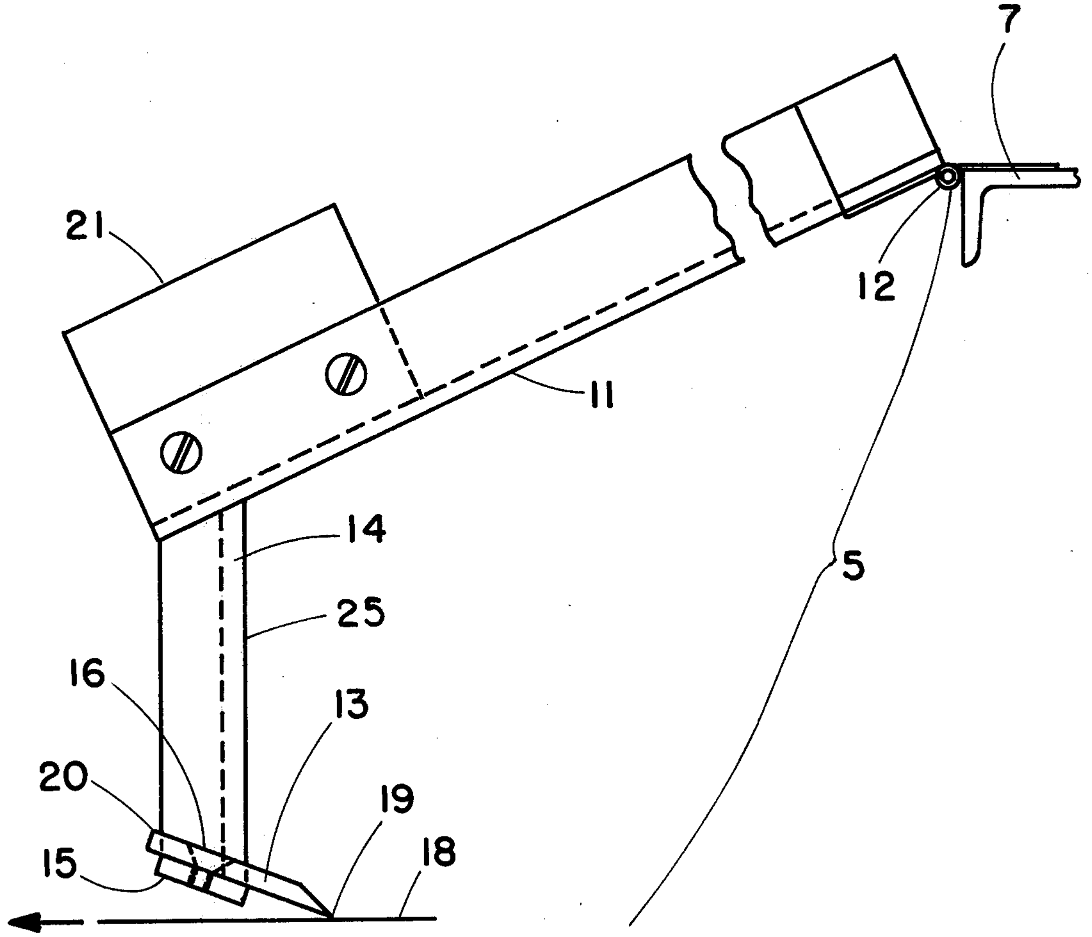
FIG. 2 is a side elevation of a doctoring unit of this invention.
Figure 4:
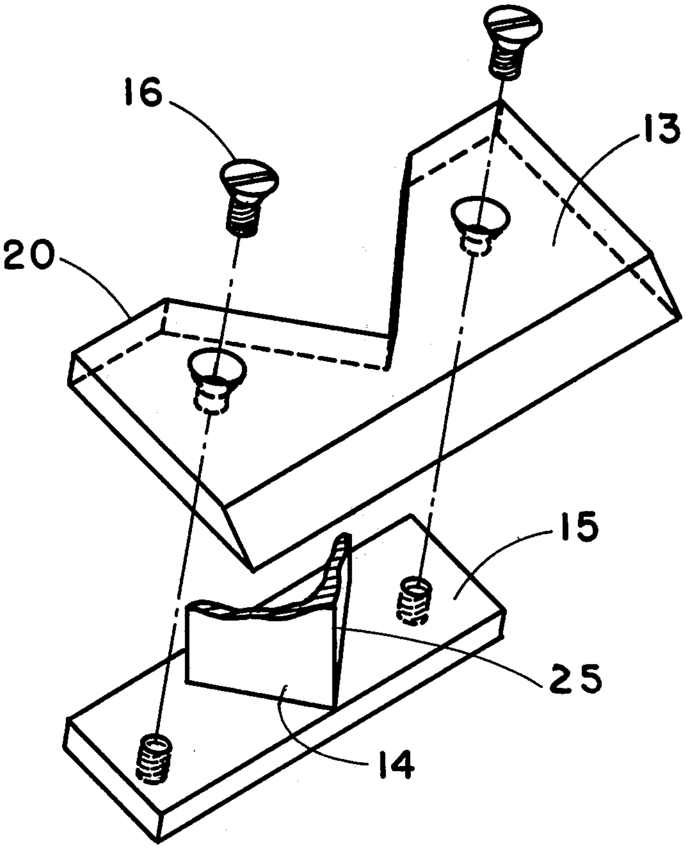
FIG. 4 is a three dimensional exploded view of a single doctoring unit of this invention.

Each doctoring unit 5 as seen in FIGS. 2 and 4 consists essentially of doctor blade 13 and V-shaped member 14 and its extension arm 11 and shelf member 15. As previously noted, the leading or knife edge 19 of doctor blade 13 is parallel to the plane of belt 18, and the leading edge 25 formed by the two plane faces of V-shaped member 14 is generally perpendicular to the plane of belt 18 when the unit is doctoring position as shown in FIG. 2. Each unit 5 is pivotally mounted by hinge 12 to the dryer body 7. Doctor blade 13, which is provided with a V-shaped cut out as seen in FIG. 4, fits snugly against V-shaped member 14 and is detachably fastened to shelf 15 of V-shaped member 14 by two flat head screws 16. Shelf 15 is permanently attached to member 14 in such fashion that when blade 13 is fastened to it, the angle that blade 13 makes with the plane of belt 18 is the correct angle for efficient doctoring.

Comestibles in cube or wedge form are fed to hot air dryer 6 by means of vibrating hopper 17. Hopper 17 deposits a uniform layer of desired thickness, two to three inches for our purposes, onto moving belt 18. For this invention, doctoring was done early in the drying cycle to prevent severe product adhesion, because we had found that product pieces stuck to each other as well as to belt 18. The sticking problem was caused by soluble solids which, in the initial drying stages, migrated to the outer surfaces of the individual cubes or wedges of the comestibles. As the product deposited by hopper 17 onto belt 18 is conveyed through dryer 6, it is severed from belt 18 by knife edge 19 of doctor blade 13. As subsequent product pieces are conveyed to the knife edge 19, they push the prior pieces up on the top surface of blade 13 to encounter member 14 which acts as a double plowshare and causes the produce pieces to move laterally. The lateral movement combined with the tubmling action imparted to the product pieces as they drop off doctor blade ledge 20 provides the necessary force to separate pieces that have adhered to each other. As a result of the action in zone 1 from the doctoring operation, surfaces of the product pieces that were previously unexposed or that are still wet or moist for other reasons are exposed causing the product pieces to again adhere to each other. Consequently, another doctoring operation is conducted in zone 2 to provide a free flowing product.

Figure 3:
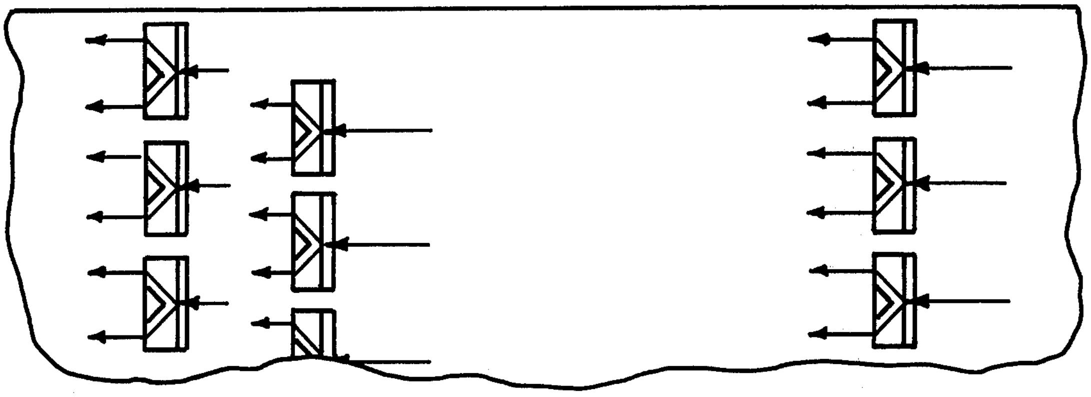
FIG. 3 is a schematic partial plan view showing the arrangement of the doctoring units over the belt width.

In order to allow the combined action of tumbling and doctoring to occur freely, doctor blades 13 are made narrow and are arranged across the width of belt 18 as shown in FIG. 3. Doctoring of the total width of belt 18 is accomplished by mounting a second row of doctoring units 5 a short distance downstream centered on the gaps in the first row as shown in FIG. 3. Although the spacial arrangement of the individual doctoring units shown in FIG. 3 is preferred, other spacial arrangements can be used with equal effectiveness. The only requirements in this regard are that the units be spaced so that the doctored product pieces can tumble freely and that the sum of the units doctor the complete width of the processing belt.

Doctoring force, which is provided automatically by the mass of arm 11, can be increased by adding weight 21 to arm 11. Two spring loaded scraper blades 22 remove adhered product from the side of belt 18 and a weighted doctor blade 23 at the discharge end completes all the necessary doctoring.

For the purposes of this invention, doctor blade 13 is made of solid filled Teflon, that is, a glass or glass fiber filled tetrafluoroethylene fluorocarbon resin and member 14 is Teflon coated. The filling makes the resin less maleable for doctoring purposes. However, other substances that are suitable for use with food products can also be used.

We claim:

1. In a process for dyring comestibles and preparing them for puffing wherein pieces of comestibles are transported on a moving belt through a multi-zoned hot air dryer, the improvement which comprises, providing at least the first two zones of the dryer with a plurality of doctoring units, each of said units being a combination doctor blade and V-shaped member wherein the doctor blade is detachably fastened to the V-shaped member and the leading edge of the doctor blade is parallel to the plane of the moving belt and the leading edge formed by the two plane faces of the V-shaped member is generally perpendicular to the plane of the belt when the unit is in doctoring position and wherein each unit is provided with means for applying doctoring force and is supported by an extension arm which is pivotally mounted, arranging said units spacially to provide room for doctored pieces to tumble freely and to allow the complete width of the belt to be doctored, applying the units such that they doctor the comestibles from the belt and impart to the pieces a lateral movement combined with a tumbling action, and then transferring the pieces directly to a puffing operation.

2. In a method for drying and preparing comestibles for a puffing operation wherein pieces of the comestibles are transported on a moving belt through a multizoned hot air dryer and the pieces doctored from the belt, the steps which comprise:

a. providing at least the first two zones of the dryer with a plurality of doctoring units, each of which is supported by a pivotally mounted extension arm and each of which is a combination doctor blade and V-shaped member, said doctor blade being detachably fastened to the V-shaped member;
b. arranging said units spacially so that there is room for doctored pieces to tumble freely and so that the complete width of the belt is doctored; and
c. preparing the comestibles for direct transfer to a puffing operation by doctoring the pieces from the belt and then imparting to the doctored pieces a lateral movement combined with a tumbling action.

* * * * *